(12) United States Patent
Potapov et al.

(10) Patent No.: US 11,544,815 B2
(45) Date of Patent: Jan. 3, 2023

(54) GAMING SUPER RESOLUTION

(71) Applicant: Advanced Micro Devices, Inc., Santa Clara, CA (US)

(72) Inventors: Alexander M. Potapov, La Jolla, CA (US); Skyler Jonathon Saleh, La Jolla, CA (US); Swapnil P. Sakharshete, La Jolla, CA (US); Vineet Goel, La Jolla, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/687,569

(22) Filed: Nov. 18, 2019

(65) Prior Publication Data

US 2021/0150669 A1 May 20, 2021

(51) Int. Cl.
 *G06T 3/40* (2006.01)
(52) U.S. Cl.
 CPC .......... *G06T 3/4046* (2013.01); *G06T 3/4053* (2013.01); *G06T 3/4069* (2013.01)
(58) Field of Classification Search
 CPC .... G06T 3/4069; G06T 3/4046; G06T 3/4053
 See application file for complete search history.

(56) References Cited

U.S. PATENT DOCUMENTS

| 2007/0071362 A1 | 3/2007 | Milanfar et al. |
| 2015/0093015 A1 | 4/2015 | Liang et al. |
| 2017/0347060 A1 | 11/2017 | Wang et al. |
| 2018/0293711 A1* | 10/2018 | Vogels ................ G06K 9/6267 |
| 2019/0350533 A1* | 11/2019 | Takeda ................ A61B 5/7267 |

FOREIGN PATENT DOCUMENTS

| EP | 1157353 B1 | 4/2009 |
| KR | 10-2013-0001213 A | 1/2013 |

OTHER PUBLICATIONS

Wang, Yifan, et al. "End-to-end image super-resolution via deep and shallow convolutional networks." IEEE Access 7 (Mar. 2019): 31959-31970. (Year: 2019).*

Shi, W., et. al., "Real-Time Single Image and Video Super-Resolution Using an Efficient Sub-Pixel Convolutional Neural Network", arXiv: 1609.05158v2, 10 pgs., Sep. 23, 2016.

* cited by examiner

*Primary Examiner* — Daniel F Hajnik
(74) *Attorney, Agent, or Firm* — Volpe Koenig

(57) ABSTRACT

A processing device is provided which includes memory and a processor. The processor is configured to receive an input image having a first resolution, generate linear down-sampled versions of the input image by down-sampling the input image via a linear upscaling network and generate non-linear down-sampled versions of the input image by down-sampling the input image via a non-linear upscaling network. The processor is also configured to convert the down-sampled versions of the input image into pixels of an output image having a second resolution higher than the first resolution and provide the output image for display.

19 Claims, 5 Drawing Sheets

GAMING SUPER RESOLUTION

BACKGROUND

Super-resolution is the process of upscaling an original image (e.g. video image, photo), via a neural network, to extract more information (e.g., details) than the amount of information present in the original image. Super-resolution techniques use information from different images or frames to create an up-scaled image. Details are extracted from each image in a sequence to reconstruct other images.

BRIEF DESCRIPTION OF THE DRAWINGS

A more detailed understanding can be had from the following description, given by way of example in conjunction with the accompanying drawings wherein.

DETAILED DESCRIPTION

Figure 1:
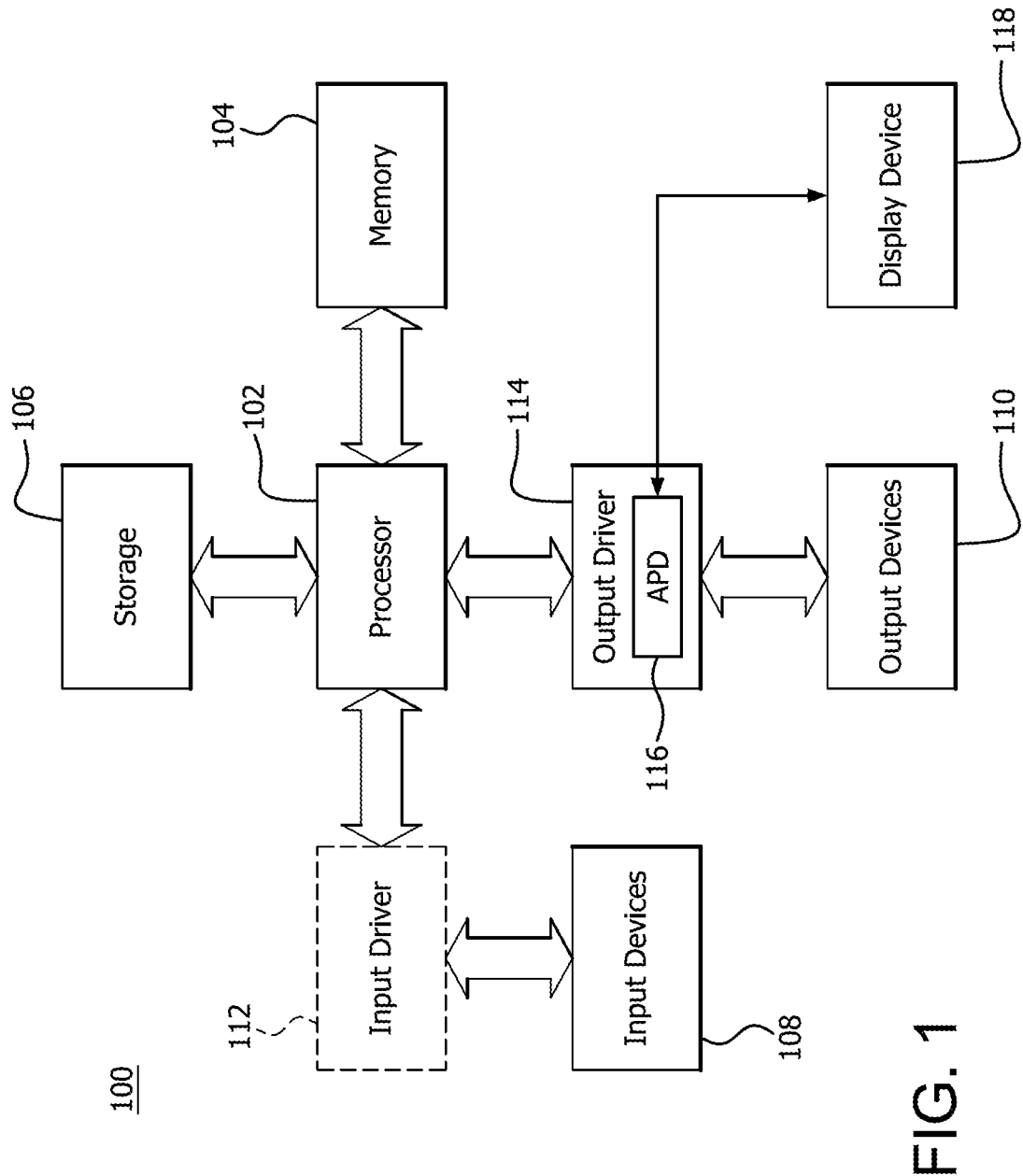
FIG. 1 is a block diagram of an example device in which one or more features of the disclosure can be implemented.

Conventional super-resolution techniques include a variety of conventional neural network architectures which perform super-resolution by upscaling images using linear functions. These linear functions do not, however, utilize the advantages of other types of information (e.g., non-linear information), which typically results in blurry and/or corrupted images. In addition, conventional neural network architectures are generalizable and trained to operate without significant knowledge of an immediate problem. Other conventional super-resolution techniques use deep learning approaches. The deep learning techniques do not, however, incorporate important aspects of the original image, resulting in lost color and lost detail information.

The present application provides devices and methods for efficiently super-resolving an image, which preserves the original information of the image while upscaling the image and improving fidelity. The devices and methods utilize linear and non-linear up-sampling in a wholly learned environment.

The devices and methods include a gaming super resolution (GSR) network architecture which efficiently super resolves images in a convolutional and generalizable manner. The GSR architecture employs image condensation and a combination of linear and nonlinear operations to accelerate the process to gaming viable levels. GSR renders images at a low quality scale to create high quality image approximations and achieve high framerates. High quality reference images are approximated by applying a specific configuration of convolutional layers and activation functions to a low quality reference image. The GSR network approximates more generalized problems more accurately and efficiently than conventional super resolution techniques by training the weights of the convolutional layers with a corpus of images.

A processing device is provided which includes memory and a processor. The processor is configured to receive an input image having a first resolution, generate linear down-sampled versions of the input image by down-sampling the input image via a linear upscaling network and generate non-linear down-sampled versions of the input image by down-sampling the input image via a non-linear upscaling network. The processor is also configured to convert the down-sampled versions of the input image into pixels of an output image having a second resolution higher than the first resolution and provide the output image for display.

A processing device is provided which includes memory and a processor configured to receive an input image having a first resolution. The processor is also configured to generate a plurality of non-linear down-sampled versions of the input image via a non-linear upscaling network and generate one or more linear down-sampled versions of the input image via a linear upscaling network. The processor is also configured to combine the non-linear down-sampled versions and the one or more linear down-sampled versions to provide a plurality of combined down-sampled versions. The processor is also configured to convert the combined down-sampled versions of the input image into pixels of an output image having a second resolution higher than the first resolution by assigning, to each of a plurality of pixel blocks of the output image, a co-located pixel in each of the combined down-sampled versions and provide the output image for display.

A super resolution processing method is provided which improves processing performance. The method includes receiving an input image having a first resolution, generating linear down-sampled versions of the input image by down-sampling the input image via a linear upscaling network and generating non-linear down-sampled versions of the input image by down-sampling the input image via a non-linear upscaling network. The method also includes converting the down-sampled versions of the input image into pixels of an output image having a second resolution higher than the first resolution and providing the output image for display.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. The APD 116 includes, for example, one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
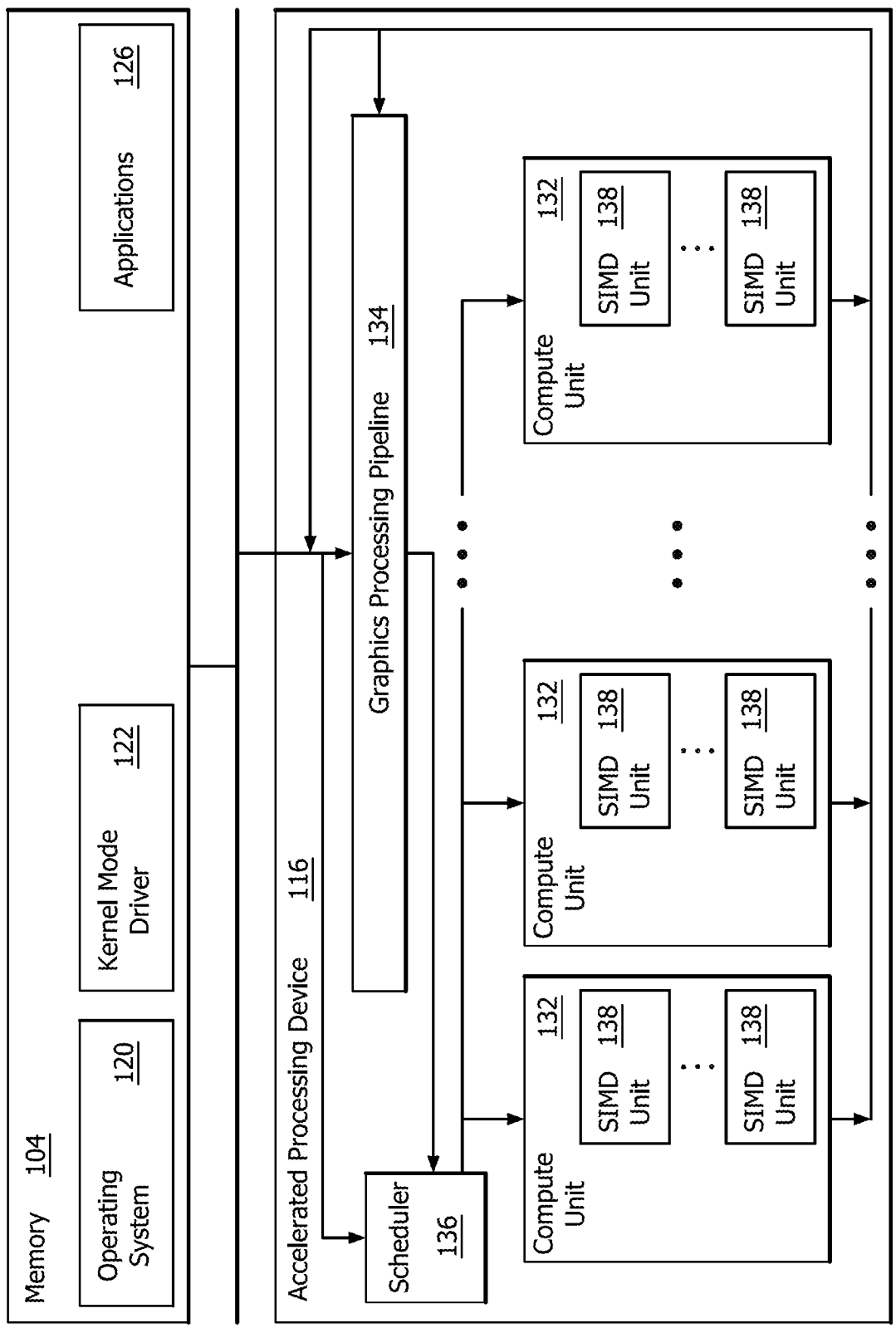
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
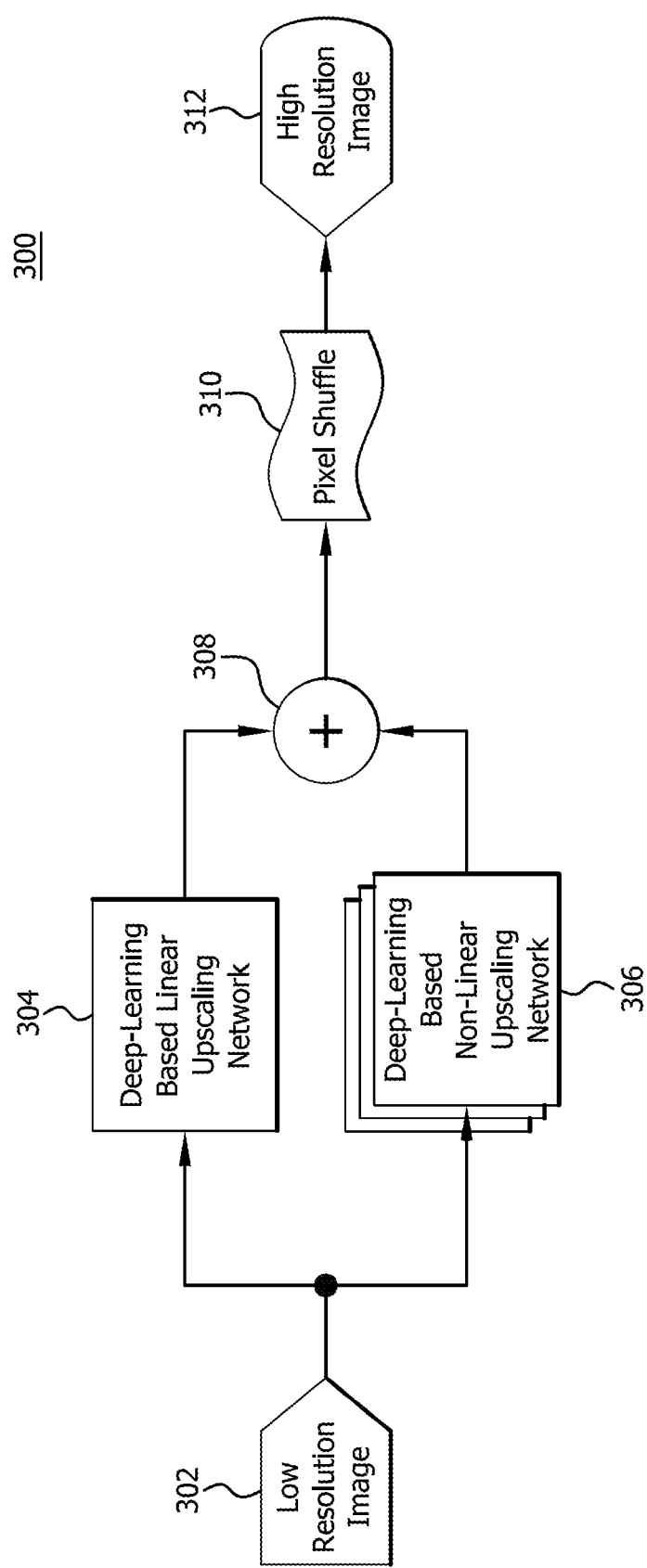
FIG. 3 is a flow diagram illustrating an example method of super resolving an image according to features of the present disclosure.
Figure 4:
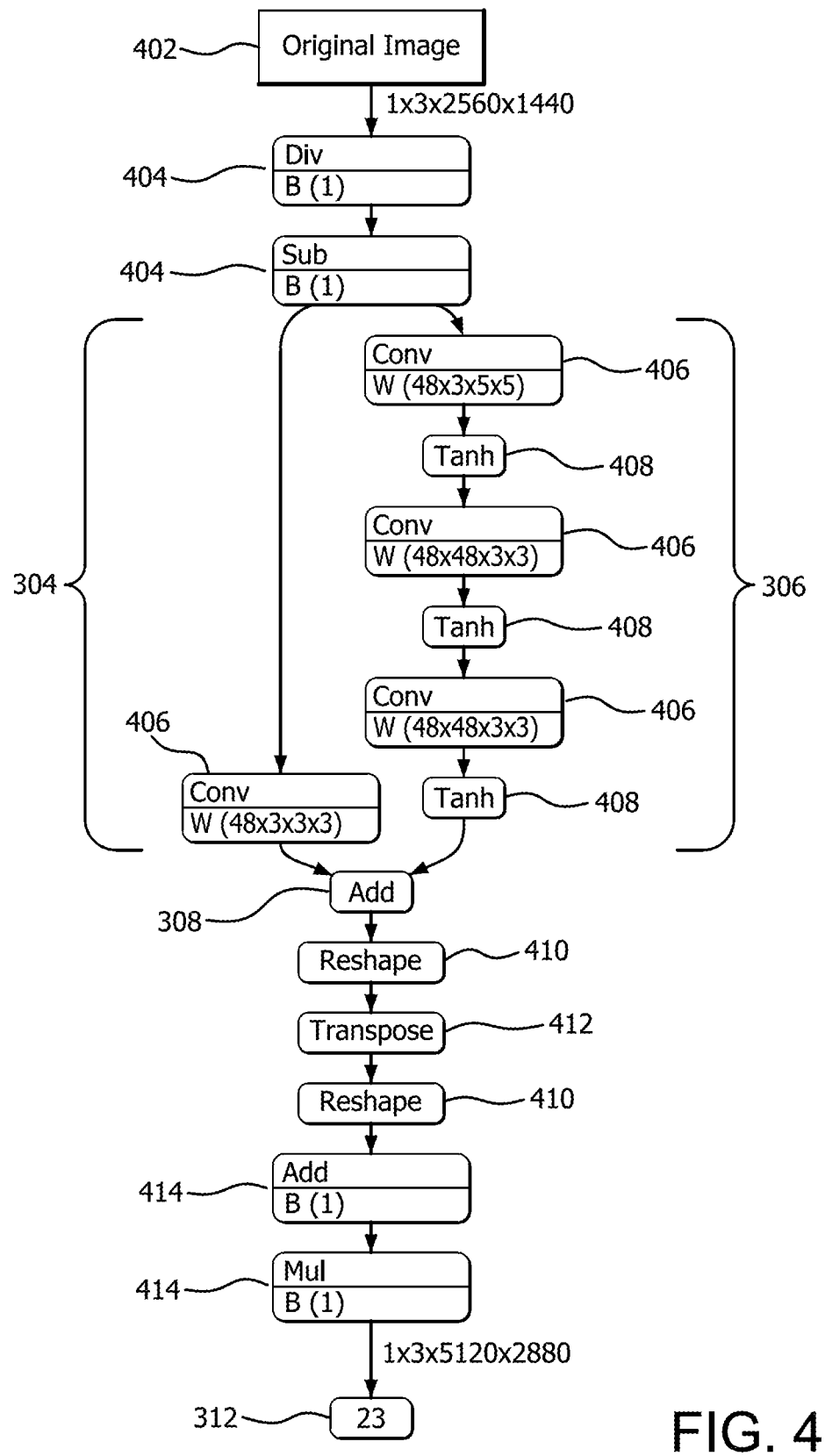
FIG. 4 is a flow diagram illustrating a more detailed example of the method shown in FIG. 3.

An example method of super resolving an image is now described with reference to FIGS. 3 and 4. FIG. 3 is a flow diagram illustrating an example method of super resolving an image. FIG. 4 is a flow diagram illustrating a more detailed example of the method shown in FIG. 3.

As shown in block 302, the method includes receiving a low resolution image. Prior to receiving the low resolution image at block 302, an original image is, for example, preprocessed using any one of a plurality of conventional normalization techniques, to condense the original image to the low resolution normalized image (i.e., the low resolution image) received at block 302. For example, as shown in block 402 of FIG. 4, an original image (e.g., 1×3×2560×1440 resolution image) is received and preprocessed (e.g., normalized) according to preprocessing operations 404 (e.g., including division and subtraction operations) to condense the original image to the low resolution normalized image received at block 302.

The low resolution image is then processed according to two different processes, as shown at blocks 304 and 306. The low resolution image is processed according to a deep-learning based linear upscaling network shown at block 304 and according to a deep-learning based non-linear upscaling network shown at block 306. In the example shown at FIG. 3, the processing shown at blocks 304 and 306, each of which operates on the low resolution image, are performed in parallel. Alternatively, when hardware does not support the processing in parallel, the linear upscaling processing and the non-linear upscaling processing are not performed in parallel.

The deep-learning based linear upscaling network includes a linear convolutional filter that down-samples the image (e.g., by ½ the resolution of the image) and extracts linear features from the image to convert from an image having a small number (e.g., 3) of feature channels (e.g., red-green-blue (RGB) channels) to a down-sampled image having a larger number (e.g., 27) of linear feature channels. That is, the low resolution image is processed to create a large number (e.g., 27) of linearly down-sampled versions of the low resolution image. The deep-learning based non-linear upscaling network processes the low resolution image, via a series of convolutional operators and activation functions, extracts non-linear features, down-samples the features and increases the amount of feature information of the low resolution image.

The combination of the linear and non-linear upscaling facilitates both the preservation of color and larger scale features (large objects and shapes that are more easily perceived by the human eye) of the image from linear upscaling as well as the preservation of finer features (e.g., curved features and features that are not easily perceived in low resolution) of the image from non-linear upscaling. Linear operations use only input data, while non-linear operations use both input data and other data (i.e., non-input data) to augment the input data. Non-linear functions facilitate accurately determining complex features (e.g., curves) of an image more efficiently than non-linear functions (e.g., convolution operations).

For example, the left path in FIG. 4 illustrates an example of linear upscaling processing 304 and the right path in FIG. 4 illustrates an example of non-linear upscaling processing 306. Each convolution operation 406 (i.e., each convolution layer) shown in the left and right paths in FIG. 4 performs a matrix mathematics operation (e.g., matrix multiply) on a window of pixel data of the low resolution image, which produces one or more down-sampled versions (i.e., one or more feature maps) of the image having multiple features but at a lower resolution. For example, each convolution operation 406 is predetermined (e.g., set prior to the runtime of super resolving images of a video stream) to produce the same number (i.e., one or more) of down-sampled versions each time (e.g., each image of the video stream) the convolution operation 406 is performed.

In the example shown in FIG. 4, the left path (i.e., linear upscaling processing 304) includes a single convolution operation 406 and the right path includes a plurality of linear convolution operations 406. The right path also includes a plurality of non-linear point wise activation functions 408 stacked between the convolutional operations 406. The number of convolution operations 406 and activation functions 408 shown in FIG. 4 is merely an example. Examples can include any number of convolutional operations and activation functions. In addition, the dimensions (e.g., 1×3×2560×1440, 48×3×5×5, 48×48×3×3 and 1×3×1520×2880) shown in FIG. 4 are merely examples.

Each activation function 408 is a non-linear mathematics function which receives element data and transforms the data into non-linear data. That is, after each convolution operation 406 is performed on input data on the right path, a non-linear point wise activation function 408 is applied to convert linear data into non-linear data. By stacking the activation functions 408 between the convolutional operations 406, a series of linear operations is converted into a series of non-linear operations. As the neural network learns to process the data, the network is constrained (i.e., limited) less by the data of the original image than if the stacking of the activation functions between the convolutional operations 406 was not performed, resulting in the input data being warped more effectively to super resolve the image.

Referring back to FIG. 3, the linearly down-sampled (e.g., ½ resolution) versions of the low resolution image 302 and the non-linear down-sampled versions of the low resolution image 302 are combined, as shown at block 308 (and in FIG. 4), to provide a combined number of down-sampled versions of the low resolution image 302. These down-sampled versions of the low resolution image 302 extract a large number of features (i.e., feature channels) from the image at a low resolution.

As shown at block 310, the method also includes a pixel shuffle process 310. For example, the pixel shuffle process 310 includes performing operations, such as reshape operations 410 and transpose operations 412 shown in FIG. 4, to provide the high resolution image 312, as described in more detail below.

Figure 5:
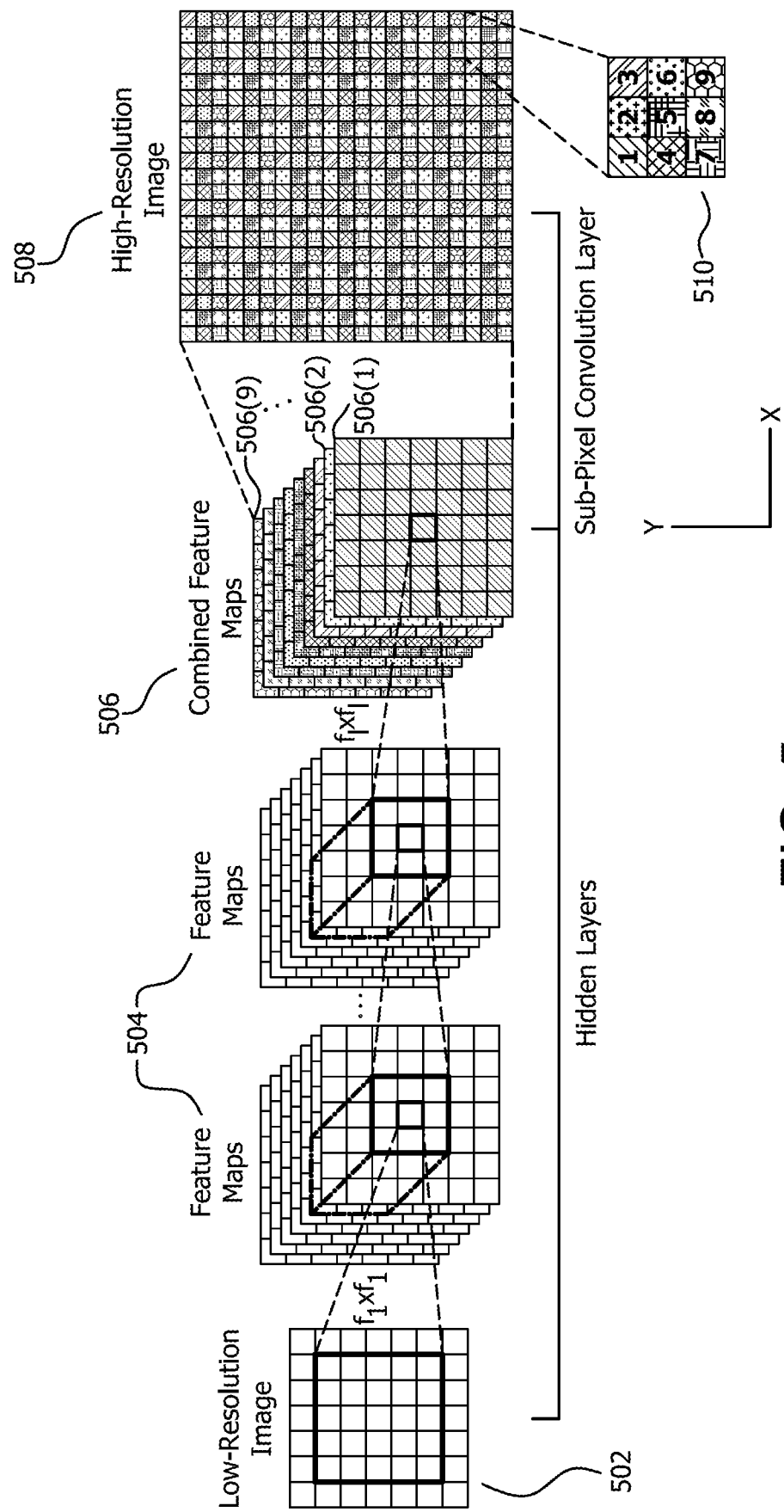
FIG. 5 is an illustration of using subpixel convolution to convert a low resolution image to a high resolution image according to features of the disclosure.

FIG. 5 is a diagram illustrating the use of subpixel (i.e., sub-resolution pixels) convolution to convert a low resolution image to a high resolution image according to features of the disclosure. The first three parts of FIG. 5 (annotated as hidden layers) illustrate the extraction of features from the low resolution image 502 to generate a plurality of down-sampled versions 504 of the low resolution image 502 according to one of the processing paths (i.e., linear upscaling processing 304 or the non-linear upscaling processing 306) shown in FIG. 3. The down-sampled versions 504 of the low resolution image 302, which extract a large number of features form the image 302 are also referred to herein as feature maps 504 and combined feature maps 506.

In the example shown in FIG. 4, the linear upscaling processing 304 at the left path includes a single convolution operation 406 (i.e., a single hidden layer), performed on a window of pixel data of the low resolution image 502 having a small number (e.g., 3) of features (e.g., RGB color features), which produces a linear down-sampled version (i.e., a feature map 504) of the image 502 having a larger number (e.g., 48) of features, including color features, non-color features and features which have color information and non-color information.

The non-linear upscaling processing 306 at the right path in FIG. 4 includes 3 pairs of convolution operations 406 (i.e., 3 hidden layers), and an activation function 408. That is, a first convolution operation 406 is performed on a window of pixel data of the image 502 followed by an activation function 408 (e.g., "Tan h" function), which produces a first non-linear version (i.e., a feature map 504) of the image 502. Next, a second convolution operation 406 is performed on a window of pixel data of the image 502 followed by a second activation function 408, which produces a second non-linear version (i.e., a feature map 504) of the image 502. Then, a third convolution operation 406 is performed on a window of pixel data of the image 502 followed by a third activation function 408, which produces a third non-linear version (i.e., a feature map 504) of the image 502.

The fourth and fifth parts of FIG. 5 (annotated as sub-pixel convolution layer) illustrate the generating of the high resolution image 508 from the combined number of down-sampled versions 506 of the low resolution image 502 resulting from the linear upscaling processing 304 and the non-linear upscaling processing 306.

The pixels shuffle process 310 includes converting the low resolution feature maps 506 into pixels of the high resolution image 508 by generating each of the blocks 510 at the higher resolution using the low resolution pixel information. As shown in the example at FIG. 5, the high resolution image 508 includes a plurality of 3×3 high resolution pixel blocks 510 each having a repeating pattern of nine pixels. In addition, nine down-sampled versions 506(1)-506(9) of the low resolution image 302 are generated to correspond to the nine pixels high resolution pixel blocks 510, in which eight of the down-sampled versions 506 represent a shifted low resolution version of the image 302 and one of the down-sampled versions 506 represents a non-shifted low resolution version of the image 302.

For example, down-sampled version 506(1) represents a low resolution version of the image 302 shifted up (i.e., up in the Y direction) by 1 pixel position and to the left (i.e., left in the X direction) by 1 pixel position. Down-sampled version 506(2) represents a low resolution version of the image 302 shifted up (i.e., up in the Y direction) by 1 pixel position. Down-sampled version 506(3) represents a low resolution version of the image 302 shifted up (i.e., up in the Y direction) by 1 pixel position and to the right (i.e., right in the X direction) by 1 pixel position. Down-sampled version 506(4) represents a low resolution version of the image 302 shifted to the left (i.e., left in the X direction) by 1 pixel position. Down-sampled version 506(5) represents a non-shifted low resolution version of the image 302. Down-sampled version 506(6) represents a low resolution version of the image 302 shifted to the right (i.e., right in the X direction) by 1 pixel position. Down-sampled version 506(7) represents a low resolution version of the image 302 shifted down (i.e., down in the Y direction) by 1 pixel position and to the left (i.e., left in the X direction) by 1 pixel position. Down-sampled version 506(8) represents a low resolution version of the image 302 shifted down (i.e., down in the Y direction) by 1 pixel position. Down-sampled version 506(9) represents a low resolution version of the image 302 shifted down (i.e., down in the Y direction) by 1 pixel position and to the right (i.e., right in the X direction) by 1 pixel position.

The pixel shuffle process 310 is implemented by assigning, to each of the high resolution pixel blocks 510, a co-located pixel in each of the nine low resolution feature maps 506. For example, the first high resolution pixel block 510, located at the top left corner of the high resolution image 508, is generated by: assigning, to pixel position 1 of the high resolution pixel block 510, the pixel at the top left corner (i.e., co-located pixel) of the first low resolution feature map 506(1); assigning, to pixel position 2 of the high resolution pixel block 510, the pixel located at the top left corner of the second low resolution feature map 506(2); assigning, to pixel position 3 of the high resolution pixel block 510, the pixel located at the top left corner of the third low resolution feature map 506(3); assigning, to pixel position 4 of the high resolution pixel block 510, the pixel located at the top left corner of the fourth low resolution feature map 506(4); assigning, to pixel position 5 of the high resolution pixel block 510, the pixel located at the top left corner of the fifth low resolution feature map 506(5); assigning, to pixel position 6 of the high resolution pixel block 510, the pixel located at the top left corner of the sixth low resolution feature map 506(6); assigning, to pixel position 7 of the high resolution pixel block 510, the pixel located at the top left corner of the seventh low resolution feature map 506(7); assigning, to pixel position 8 of the high resolution pixel block 510, the pixel located at the top left corner of the eighth low resolution feature map 506(8); and assigning, to pixel position 9 of the high resolution pixel block 510, the pixel located at the top left corner of the ninth low resolution feature map 506(9).

The next high resolution pixel block 510 (i.e., block to the right of the first high resolution pixel block 510) is generated in a similar manner to the first high resolution pixel block 510 by assigning, to each pixel position 1-9 of the high resolution pixel block 510, the co-located pixels (i.e., pixels located to the right of the pixels at the top left corner) in each respective low resolution feature map 506(1)-106(9). The process continues for each of the remaining high resolution pixel blocks 510 of the high resolution image 508.

After the pixel shuffle process 310 is performed and prior to generating the high resolution image 312, additional processing operations 414, which include addition and multiplication operations are performed to undo the normalization of the original image 402, performed by the subtraction and division operations 404, and return the original image 402 back to a standard color space.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132 and the SIMD units 138 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory; and
   a processor configured to:
   receive an input image having a first resolution;
   generate at least one linear down-sampled version of the input image via a linear upscaling network;
   generate at least one non-linear down-sampled version of the input image via a non-linear upscaling network;
   convert the at least one linear down-sampled version of the input image and the at least one non-linear down-sampled version of the input image into pixels of an output image having a second resolution higher than the first resolution by assigning a co-located pixel in each of the down-sampled versions of the input image to each of a plurality of pixel blocks of the output image, wherein different pixel positions of the plurality of pixel blocks comprise the co-located pixel from a corresponding down-sampled version of the input image; and
   provide the output image for display.

2. The processing device of claim 1, wherein the processor is configured to generate the at least one non-linear down-sampled version of the input image, via the non-linear upscaling network, by stacking an activation function between each of a plurality of convolutional operations to convert a series of linear operations into a series of non-linear operations.

3. The processing device of claim 1, wherein the processor is configured to generate the at least one linear down-sampled version of the input image, via the linear upscaling network, by performing one or more convolution operations on a window of pixels of the input image.

4. The processing device of claim 1, wherein the processor is configured to convert the at least one linear down-sampled version of the input image and the at least one non-linear down-sampled version of the input image into pixels by generating, for the output image, the plurality of pixel blocks, each pixel block comprising the co-located pixel from each of the down-sampled versions of the input image.

5. The processing device of claim 1, wherein a total number of the different pixel positions of each pixel block is equal to a total number of the down-sampled versions of the input image.

6. The processing device of claim 1, wherein the linear upscaling network comprises one or more convolution operations, the non-linear upscaling network comprises a plurality of convolution operations, each convolution operation produces a same number of linear down-sampled versions or a same number of non-linear down-sampled versions each time a corresponding convolution operation is performed.

7. A processing device comprising:
   memory; and
   a processor configured to:
   receive an input image having a first resolution;
   generate a plurality of non-linear down-sampled versions of the input image via a non-linear upscaling network;
   generate a plurality of linear down-sampled versions of the input image via a linear upscaling network;
   combine the plurality of non-linear down-sampled versions and the plurality of linear down-sampled versions to provide a plurality of combined down-sampled versions of the input image;
   convert the combined down-sampled versions of the input image into pixels of an output image having a second resolution higher than the first resolution by assigning, to each of a plurality of pixel blocks of the output image, a co-located pixel in each of the combined down-sampled versions; and
   provide the output image for display.

8. The processing device of claim 7, wherein each of the plurality of non-linear down-sampled versions comprises at least one of color features, non-color features and features which have color information and non-color information.

9. The processing device of claim 7, wherein the processor is configured to generate the plurality of non-linear down-sampled versions of the input image in parallel with the plurality of linear down-sampled versions of the input image.

10. The processing device of claim 7, wherein the processor is configured to generate the plurality of non-linear down-sampled versions by stacking activation functions between convolutional operations to convert a series of linear operations into a series of non-linear operations.

11. The processing device of claim 7, wherein the processor is configured to generate the plurality of linear down-sampled versions of the input image, via the linear upscaling network, by performing at least one convolution operation on a window of pixels of the input image.

12. The processing device of claim 7, wherein each pixel block of the output image comprises a plurality of pixels, each pixel located at one of a number of different positions of each pixel block, and
   each position comprises the co-located pixel from a corresponding down-sampled version of the input image.

13. The processing device of claim 12, wherein a total number of the different pixel positions of each pixel block is equal to a total number of the down-sampled versions of the input image.

14. The processing device of claim 7, wherein the linear upscaling network comprises one or more convolution operations, the non-linear upscaling network comprises a plurality of convolution operations, each convolution operation produces a same number of linear down-sampled versions or a same number of non-linear down-sampled versions each time a corresponding convolution operation is performed.

15. A super resolution processing method comprising:
receiving an input image having a first resolution;
generating at least one linear down-sampled version of the input image via a linear upscaling network;
generating at least one non-linear down-sampled version of the input image via a non-linear upscaling network;
converting the at least one linear down-sampled version of the input image and the at least one non-linear down-sampled version of the input image into pixels of an output image having a second resolution higher than the first resolution by assigning a co-located pixel in each of the down-sampled versions of the input image to each of a plurality of pixel blocks of the output image, wherein different pixel positions of the plurality of pixel blocks comprise the co-located pixel from a corresponding down-sampled version of the input image; and
providing the output image for display.

16. The method of claim 15, wherein generating the at least one non-linear down-sampled version of the input image, via the non-linear upscaling network, comprises stacking an activation function between each of a plurality of convolutional operations to convert a series of linear operations into a series of non-linear operations.

17. The method of claim 15, wherein generating the at least one linear down-sampled version of the input image, via the linear upscaling network, comprises performing a convolution operation on a window of pixels of the input image.

18. The method of claim 15, wherein converting the at least one linear down-sampled version of the input image and the at least one non-linear down-sampled version of the input image into pixels by generating, for the output image, the plurality of pixel blocks, each pixel block comprising the co-located pixel from each of the down-sampled versions of the input image.

19. The method of claim 15, wherein the linear upscaling network comprises one or more convolution operations, the non-linear upscaling network comprises a plurality of convolution operations, each convolution operation produces a same number of linear down-sampled versions or a same number of non-linear down-sampled versions each time a corresponding convolution operation is performed.

* * * * *